United States Patent
Peng et al.

(10) Patent No.: US 7,805,063 B2
(45) Date of Patent: Sep. 28, 2010

(54) SPEED CONTROL SYSTEM FOR A CEILING FAN MOTOR

(75) Inventors: Aiqian Peng, Zhongshan (CN); Wenwei Huang, Zhongshan (CN); Maosen Zeng, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 349 days.

(21) Appl. No.: 11/764,301

(22) Filed: Jun. 18, 2007

(65) Prior Publication Data
US 2008/0037962 A1 Feb. 14, 2008

(30) Foreign Application Priority Data
Aug. 11, 2006 (CN) .................... 2006 2 0062964 U

(51) Int. Cl.
*H02P 7/06* (2006.01)
(52) U.S. Cl. .................. 388/801; 388/803; 318/400.01; 318/700
(58) Field of Classification Search ............ 318/400.01, 318/700; 388/801, 803; 417/424.1
See application file for complete search history.

(56) References Cited

U.S. PATENT DOCUMENTS

| | | | | |
|---|---|---|---|---|
| 5,189,412 A | * | 2/1993 | Mehta et al. ........... | 340/825.22 |
| 6,120,262 A | * | 9/2000 | McDonough et al. ..... | 417/424.1 |
| 7,194,321 B2 | * | 3/2007 | Sun et al. ............... | 318/400.01 |
| 7,196,485 B1 | * | 3/2007 | Lee et al. ............... | 318/400.38 |
| 7,245,096 B2 | * | 7/2007 | Echazarreta .......... | 318/400.01 |
| 7,268,505 B2 | * | 9/2007 | Pant et al. ............. | 318/400.01 |
| 2004/0191087 A1 | * | 9/2004 | Liu ........................... | 417/326 |

* cited by examiner

*Primary Examiner*—Rita Leykin
(74) *Attorney, Agent, or Firm*—Matthias Scholl P.C.

(57) ABSTRACT

The invention teaches a speed control system for a brushless DC motor for a ceiling fan, comprising a power circuit 1, a microprocessor circuit 2, a power drive circuit 3, a speed regulation circuit, and a brushless DC permanent magnetic motor 5, wherein the input terminal of the power circuit 1 is connected to the output terminal 101 of an AC power source, the output terminal of the power circuit 1 serves to power the various circuits, the output terminal of the microprocessor circuit 2 is connected to the input terminal of the power drive circuit 3, the output terminal of the power drive circuit 3 is connected to the coil windings 501 of the brushless DC permanent magnetic motor, and the output terminal of the speed regulation circuit is connected to the input terminal of the microprocessor circuit 2. The speed control system of the invention provides the advantages of low energy consumption, low noise during the operation of the motor, and a stable operation at low speeds.

5 Claims, 1 Drawing Sheet

SPEED CONTROL SYSTEM FOR A CEILING FAN MOTOR

CROSS-REFERENCE TO RELATED APPLICATIONS

Pursuant to 35 U.S.C. §119 and the Paris Convention Treaty, this application claims the benefit of Chinese Patent Application No. 200620062964.X filed Aug. 11, 2006, the contents of which are incorporated herein by reference.

BACKGROUND OF THE INVENTION

1. Field of the Invention

The invention relates to a speed control system for a brushless DC motor, and more particularly to a speed control system for a brushless DC motor for use in a ceiling fan.

2. Description of the Related Art

Conventional ceiling fans employ single-phase AC induction motors characterized by high energy consumption, low efficiency, booming noise, and unstable operation at low speeds. In addition, the function of the control circuit in single-phase AC induction motors is relative simple, and needs to be improved.

SUMMARY OF THE INVENTION

Therefore, it is one objective of the invention to provide a speed control system for a brushless DC motor for use in a ceiling fan having the advantages of easy speed regulation, low energy consumption, and low noise during the operation of the motor.

To achieve the above objective, provided a speed control system for a brushless DC motor for ceiling fan, comprising a power circuit, a microprocessor circuit, a power drive circuit, a speed regulation circuit, and a brushless DC permanent magnetic motor. The input terminal of the power circuit is connected to the output terminal of an AC power source. The output terminal of the power circuit serves to power the various circuits. The output terminal of the microprocessor circuit is connected to the input terminal of the power drive circuit. The output terminal of the power drive circuit is connected to the coil windings of the brushless DC permanent magnetic motor. The output terminal of the speed regulation circuit is connected to the input terminal of the microprocessor circuit.

In certain embodiments of the invention, the speed regulation circuit is a wireless speed regulation circuit, or a wired speed regulation circuit, or comprises a wireless speed regulation circuit and a wired speed regulation circuit simultaneously.

In certain embodiments of the invention, the wireless speed regulation circuit comprises a wireless receiver module, a wireless signal processing circuit, and a wireless transmission module. The wireless transmission module is wirelessly connected to the wireless receiver module. The output terminal of the wireless receiver module is connected to the input terminal of the wireless signal processing circuit. The output terminal of the wireless signal processing circuit is connected to the input terminal of the microprocessor circuit.

In certain embodiments of the invention, the wireless transmission module comprises at least two control buttons serving to power on and off the ceiling fan, or controlling the speed of the ceiling fan etc In certain embodiments of the invention, the wired speed regulation circuit comprises a manual control box and an optoelectronic isolating circuit. The output terminal of the manual control box is connected to the input terminal of the optoelectronic isolating circuit 702, the output terminal of optoelectronic isolating circuit 702 is connected to the input terminal of the microprocessor circuit 2.

In certain embodiments of the invention, the manual control box comprises at least two control buttons serving to power on and off the ceiling fan, or controlling the speed of the ceiling fan etc.

As a result, the speed control system of the invention (1) provides the advantages of low energy consumption, low noise during the operation of motor, and stable operation at low speeds; (2) has a reasonable structure, provides a perfect function, and has a high degree of sophistication; (3) facilitates the speed control of a ceiling fan by setting the speed regulation circuit; and (4) employs a wireless receiver module and a wireless transmission module to transmit the speed regulation signal for convenient application.

BRIEF DESCRIPTION OF THE DRAWINGS

The objects and advantages of the invention will become more readily apparent after reading the ensuing descriptions of the non-limiting illustrative embodiment and viewing the accompanying drawings, in which.

DETAILED DESCRIPTION OF THE EMBODIMENTS

Figure 1:
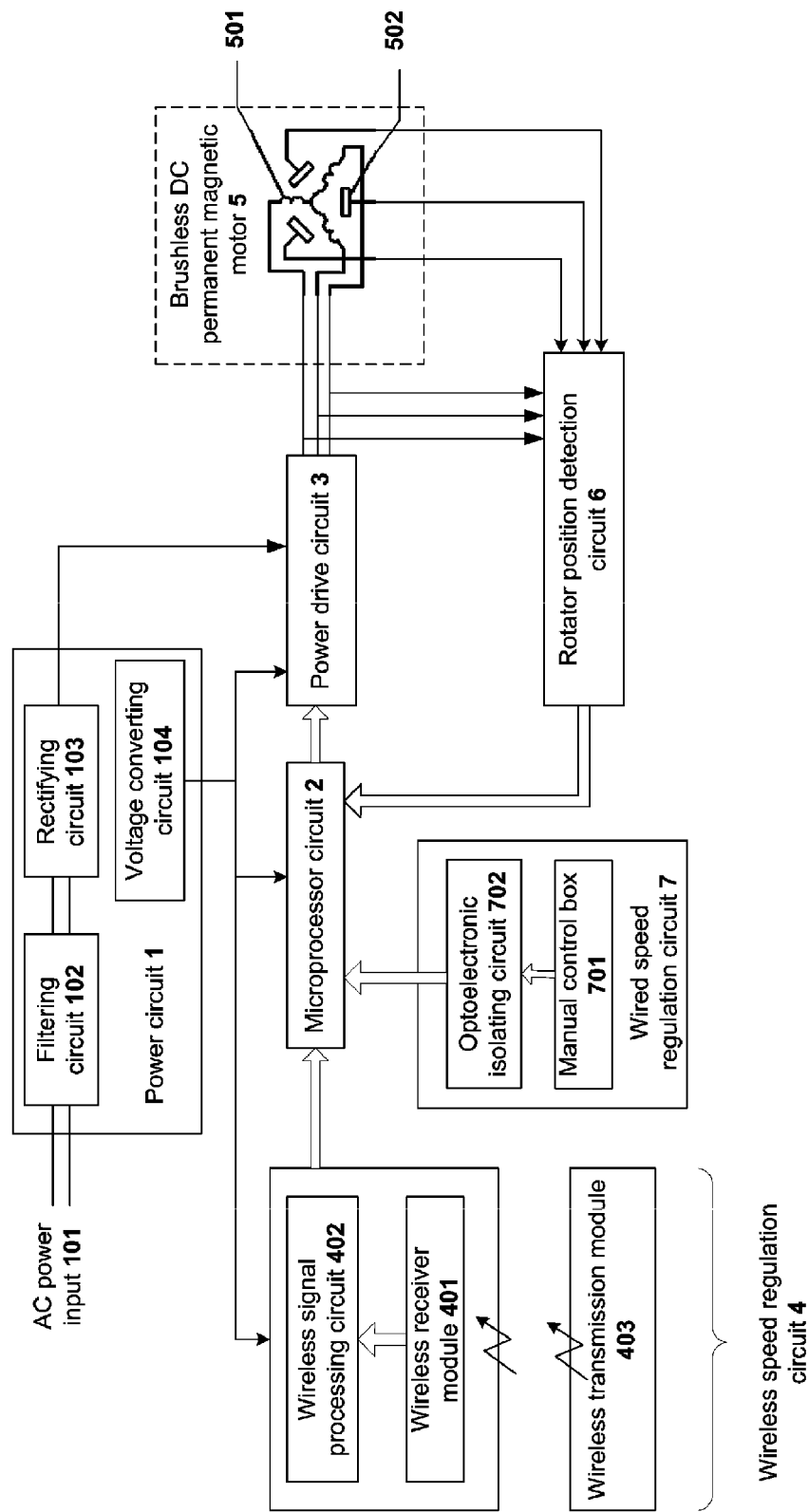
FIG. 1 is a block diagram of a speed control system for a brushless DC motor for a ceiling fan in accordance with one embodiment of the invention.

As shown in FIG. 1, the speed control system for a brushless DC motor for a ceiling fan comprises a power circuit 1, a microprocessor circuit 2, a power drive circuit 3, a speed regulation circuit 4, 7, and a brushless DC permanent magnetic motor 5. The input terminal of the power circuit 1 is connected to the output terminal 101 of an AC power source. The output terminal of the power circuit 1 serves to power the various circuits. The output terminal of the microprocessor circuit 2 is connected to the input terminal of the power drive circuit 3. The output terminal of the power drive circuit 3 is connected to the coil windings 501 of the brushless DC permanent magnetic motor. The output terminal of the speed regulation circuit is connected to the input terminal of the microprocessor circuit 2.

The speed regulation circuit is a wireless speed regulation circuit 4, or a wired speed regulation circuit 7, or comprises the wireless speed regulation circuit 4 and the wired speed regulation circuit 7 simultaneously.

The wireless speed regulation circuit 4 comprises a wireless receiver module 401, a wireless signal processing circuit 402, and a wireless transmission module 403. The wireless transmission module 403 is wirelessly-connected with the wireless receiver module 401. The output terminal of the wireless receiver module 401 is connected to the input terminal of the wireless signal processing circuit 402. The output terminal of the wireless signal processing circuit 402 is connected to the input terminal of the microprocessor circuit 2. The wireless transmission module 403 comprises at least two control buttons serving to power on and off the ceiling fan, or controlling the speed of the ceiling fan etc.

The wired speed regulation circuit 7 comprises a manual control box 701 and an optoelectronic isolating circuit 702. The manual control box 701 is connected to the microprocessor circuit 2 via the optoelectronic isolating circuit. The manual control box 701 comprises at least two control buttons serving to power on and off the ceiling fan, or controlling the speed of the ceiling fan, respectively.

The input terminal of the microprocessor circuit 2 is further connected with a rotor position detection circuit 6. The rotor position detection circuit 6 obtains the rotor position signal from the position sensor 502 installed on the brushless DC motor, or from the position between the output terminal of the power drive circuit 3 and the coil windings 501 of the brushless DC motor.

The power circuit 1 comprises a filtering circuit 102, a rectifying circuit 103, and a voltage converting circuit 104.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A speed control system for a brushless permanent magnet DC motor for a ceiling fan comprising:
   a power circuit 1 having an input terminal and an output terminal;
   a microprocessor circuit 2 having an input terminal and an output terminal;
   a power drive circuit 3 having an input terminal and an output terminal;
   a speed regulation circuit 4, 7 having an output terminal; and
   a brushless DC permanent magnetic motor 5;
   wherein
   said input terminal of the power circuit 1 is directly connected to an output terminal 101 of an AC power source;
   said output terminal of the power circuit 1 directly provides power to said microprocessor circuit 2, said power drive circuit 3, and said speed regulation circuit 4, 7;
   said output terminal of the microprocessor circuit 2 is directly connected to said input terminal of said power drive circuit 3;
   said output terminal of said power drive circuit 3 is directly connected to coil windings 501 of the motor;
   said output terminal of said speed regulation circuit is directly connected to said input terminal of said microprocessor circuit 2;
   said speed regulation circuit comprises a wireless speed regulation circuit 4 and a wired speed regulation circuit 7 simultaneously; and
   said wire speed regulation circuit 7 comprises a manual control box 701 and an optoelectronic isolating circuit 702 having an output terminal and an input terminal and said output terminal of the manual control box 701 is directly connected to the input terminal of the optoelectronic isolating circuit 702, the output terminal of optoelectronic isolating circuit702 is directly connected to the input terminal of the microprocessor circuit 2, and said wired speed regulation circuit is not directly connected to said brushless DC permanent magnetic motor 5.

2. A speed control system for a brushless permanent magnet DC motor for a ceiling fan comprising
   a power circuit 1 having an input terminal and an output terminal;
   a microprocessor circuit 2 having an input terminal and an output terminal;
   a power drive circuit 3 having an input terminal and an output terminal;
   a speed regulation circuit 4, 7 having an output terminal; and
   a brushless DC permanent magnetic motor 5;
   wherein
   said input terminal of the power circuit 1 is directly connected to an output terminal 101 of an AC power source;
   said output terminal of the power circuit 1 directly provides power to said microprocessor circuit 2, said power drive circuit 3, and said speed regulation circuit 4, 7;
   said output terminal of the microprocessor circuit 2 is directly connected to said input terminal of said power drive circuit 3;
   said output terminal of said power drive circuit 3 is directly connected to coil windings 501 of the motor;
   said output terminal of said speed regulation circuit is directly connected to said input terminal of said microprocessor circuit 2;
   said speed regulation circuit comprises a wireless speed regulation circuit 4 and a wired speed regulation circuit 7 simultaneously;
   said wireless speed regulation circuit 4 comprises a wireless receiver module 401 having an output terminal, a wireless signal processing circuit 402 having an input terminal and an output terminal, and a wireless transmission module 403;
   said wireless transmission module 403 is directly wirelessly connected to said wireless receiver module 401;
   said output terminal of said wireless receiver module 401 is directly connected to said input terminal of said wireless signal processing circuit 402,
   said output terminal of said wireless signal processing circuit 402 is directly connected to said input terminal of the microprocessor circuit 2;
   said wire speed regulation circuit 7 comprises a manual control box 701 and an optoelectronic isolating circuit 702 having an output terminal and an input terminal and said output terminal of the manual control box 701 is directly connected to the input terminal of the optoelectronic isolating circuit 702, the output terminal of optoelectronic isolating circuit702 is directly connected to the input terminal of the microprocessor circuit 2, and said wired speed regulation circuit is not directly connected to said brushless DC permanent magnetic motor 5;
   said wireless transmission module 403 comprises at least two control buttons for controlling the speed of the ceiling fan, or serving to power on and off the ceiling fan; and
   said manual control box 701 comprises at least two control buttons serving to power on and off the ceiling fan, or controlling the speed of the ceiling fan.

3. The speed control system of claim 2, wherein said input terminal of said microprocessor circuit 2 is further directly connected with a rotor position detection circuit 6, and said a rotor position detection circuit 6 directly obtains rotor position signal from a position sensor 502 installed on said brushless DC motor.

4. The speed control system of claim 2, wherein said input terminal of said microprocessor circuit 2 is further directly connected with a rotor position detection circuit 6, and said a rotor position detection circuit 6 directly obtains rotor position signal from the position between the output terminal of the power drive circuit 3 and the coil windings 501 of the motor.

5. The speed control system of claim 2, wherein the power circuit 1 comprises a filtering circuit 102, a rectifying circuit 103, and a voltage converting circuit 104.

* * * * *